(12) United States Patent
Zaghib et al.

(10) Patent No.: US 11,335,894 B2
(45) Date of Patent: May 17, 2022

(54) MULTILAYER MATERIAL BASED ON ACTIVE LITHIUM, METHOD OF PREPARATION AND APPLICATIONS IN ELECTROCHEMICAL GENERATORS

(71) Applicant: HYDRO-QUEBEC, Montreal (CA)

(72) Inventors: Karim Zaghib, Longueuil (CA);
Martin Dontigny, Varennes (CA);
Michel Petitclerc, Sainte-Julie (FR);
Michel Gauthier, La Prairie (CA)

(73) Assignee: HYDRO-QUEBEC, Montreal (CA)

( * ) Notice: Subject to any disclaimer, the term of this patent is extended or adjusted under 35 U.S.C. 154(b) by 79 days.

(21) Appl. No.: 16/593,408

(22) Filed: Oct. 4, 2019

(65) Prior Publication Data
US 2020/0243833 A1    Jul. 30, 2020

Related U.S. Application Data

(63) Continuation of application No. 13/724,058, filed on Dec. 21, 2012, now abandoned, which is a
(Continued)

(30) Foreign Application Priority Data

Jul. 18, 2006    (CA) .................................. CA 2552282

(51) Int. Cl.
*H01M 4/04*    (2006.01)
*H01M 10/0565*    (2010.01)
(Continued)

(52) U.S. Cl.
CPC ............. *H01M 4/0402* (2013.01); *C23C 4/11* (2016.01); *C23C 8/10* (2013.01); *C23C 28/00* (2013.01);
(Continued)

(58) Field of Classification Search
CPC ..... C23C 28/00; C23C 28/321; C23C 28/322; C23C 28/324; C23C 28/34; C23C 28/345;
(Continued)

(56) References Cited

U.S. PATENT DOCUMENTS

| 3,639,174 A | 2/1972 | Kegelman et al. |
| 4,520,083 A | 5/1985 | Prater et al. |

(Continued)

FOREIGN PATENT DOCUMENTS

| CA | 2099524 A1 | 1/1995 |
| CA | 2099526 A1 | 1/1995 |

(Continued)

OTHER PUBLICATIONS

International Search Report for PCT/CA2007/001254 completed Dec. 6, 2007.
(Continued)

*Primary Examiner* — Adam A Arciero
(74) *Attorney, Agent, or Firm* — Buchanan Ingersoll & Rooney P.C.

(57) ABSTRACT

A method for preparing a multilayer material based on active lithium, by depositing a film of active lithium on a protective layer at a sufficient speed so that substantially no oxidation of the lithium occurs, and/or during a sufficient time for the adhesion of the lithium to develop after contact with the protective layer. The multilayer material, when incorporated in an electrochemical battery as an anode, has excellent impedance stability and no formation of dendrites during the cycling. Batteries where the anode is the multilayer material are particularly efficient in terms of their coulombic efficiency.

23 Claims, 2 Drawing Sheets

Related U.S. Application Data continuation of application No. 12/373,945, filed as application No. PCT/CA2007/001254 on Jul. 17, 2007, now abandoned.

(51) Int. Cl.
| | | |
|---|---|---|
| *H01M 4/525* | (2010.01) | |
| *H01M 4/131* | (2010.01) | |
| *C23C 28/00* | (2006.01) | |
| *H01M 4/505* | (2010.01) | |
| *H01M 4/66* | (2006.01) | |
| *H01M 4/62* | (2006.01) | |
| *C23C 8/10* | (2006.01) | |
| *H01M 4/1391* | (2010.01) | |
| *H01M 10/052* | (2010.01) | |
| *C23C 4/11* | (2016.01) | |
| *H01M 4/36* | (2006.01) | |

(52) U.S. Cl.
CPC .......... *C23C 28/321* (2013.01); *C23C 28/322* (2013.01); *C23C 28/324* (2013.01); *C23C 28/34* (2013.01); *C23C 28/345* (2013.01); *H01M 4/0407* (2013.01); *H01M 4/131* (2013.01); *H01M 4/1391* (2013.01); *H01M 4/366* (2013.01); *H01M 4/505* (2013.01); *H01M 4/525* (2013.01); *H01M 4/625* (2013.01); *H01M 4/661* (2013.01); *H01M 10/052* (2013.01); *H01M 10/0565* (2013.01)

(58) Field of Classification Search
CPC .......... C23C 4/11; C23C 8/10; H01M 10/052; H01M 10/0565; H01M 4/0402; H01M 4/0407; H01M 4/131; H01M 4/1391; H01M 4/366; H01M 4/505; H01M 4/525; H01M 4/625; H01M 4/661
See application file for complete search history.

(56) References Cited

U.S. PATENT DOCUMENTS

| | | | |
|---|---|---|---|
| 4,615,961 A | 10/1986 | Park et al. | |
| 4,824,746 A | 4/1989 | Belanger et al. | |
| 5,487,959 A | 1/1996 | Koksbang | |
| 5,528,920 A * | 6/1996 | Bouchard | H01M 4/04 72/205 |
| 5,804,330 A * | 9/1998 | Miyazaki | H01M 4/02 429/127 |
| 5,837,401 A | 11/1998 | Gauthier et al. | |
| 5,916,515 A * | 6/1999 | Bryan | H01M 10/0413 29/623.3 |
| 6,019,801 A | 2/2000 | Gauthier et al. | |
| 6,025,094 A | 2/2000 | Visco et al. | |
| 6,030,421 A | 2/2000 | Gauthier et al. | |
| 6,053,953 A * | 4/2000 | Tomiyama | H01M 10/0525 29/623.1 |
| 6,103,416 A * | 8/2000 | Bauerlein | H01M 10/05 429/127 |
| 6,190,804 B1 | 2/2001 | Ishiko et al. | |
| 6,203,938 B1 | 3/2001 | Yoshida et al. | |
| 6,214,061 B1 | 4/2001 | Visco et al. | |
| 6,402,795 B1 * | 6/2002 | Chu | H01M 10/052 29/623.5 |
| 6,413,284 B1 | 7/2002 | Chu et al. | |
| 6,413,285 B1 | 7/2002 | Chu et al. | |
| 6,413,675 B1 | 7/2002 | Harada et al. | |
| 6,432,584 B1 * | 8/2002 | Visco | H01M 4/04 429/231.95 |
| 6,737,197 B2 | 5/2004 | Chu et al. | |
| 6,936,381 B2 | 8/2005 | Skotheim et al. | |
| 7,700,019 B2 | 4/2010 | Lavoie et al. | |
| 2003/0215710 A1 | 11/2003 | Lavoie et al. | |
| 2004/0126653 A1 | 7/2004 | Visco et al. | |
| 2004/0159964 A1 | 8/2004 | Lavoie et al. | |
| 2004/0219412 A1 | 11/2004 | Kimura et al. | |
| 2005/0008934 A1 | 1/2005 | Oyama et al. | |
| 2005/0061047 A1 * | 3/2005 | Laliberte | H01M 4/13 72/147 |
| 2005/0175894 A1 | 8/2005 | Visco et al. | |
| 2006/0062904 A1 | 3/2006 | West et al. | |

FOREIGN PATENT DOCUMENTS

| | | |
|---|---|---|
| EP | 0692831 A1 | 1/1996 |
| JP | 2003163004 A | 6/2003 |
| JP | 2003-529895 A | 10/2003 |
| JP | 2004-165097 A | 6/2004 |
| JP | 2006100083 A | 4/2006 |
| JP | 2006179235 A | 7/2006 |
| WO | 03/0632870 A3 | 7/2003 |
| WO | 03067687 A1 | 8/2003 |
| WO | 2004051769 A2 | 6/2004 |
| WO | 2004/068610 | 8/2004 |

OTHER PUBLICATIONS

Written Opinion of the International Searching authority for PCT/CA2007/001254 completed Dec. 10, 2007.

Office Action issued in corresponding Chinese Patent Application No. 200780026871.9 dated Jan. 14, 2014.

Office Action (Decision of Rejection) dated Jun. 19, 2014, by the Japanese Patent Office in corresponding Japanese Patent Application No. 2009-519761, and an English Translation of the Office Action. (11 pages).

Office Action (Examiner's Report of Reconsideration) dated Nov. 28, 2014, by the Japanese Patent Office in corresponding Japanese Patent Application No. 2009-519761, and an English Translation of the Office Action. (5 pages).

* cited by examiner

MULTILAYER MATERIAL BASED ON ACTIVE LITHIUM, METHOD OF PREPARATION AND APPLICATIONS IN ELECTROCHEMICAL GENERATORS

CROSS REFERENCE TO RELATED APPLICATIONS

The present application is a continuation of U.S. application Ser. No. 13/724,058, filed on Dec. 21, 2012, which is a continuation of U.S. application Ser. No. 12/373,945, filed on Jan. 15, 2009, which is a national stage of International Application No. PCT/CA2007/001254, filed on Jul. 17, 2007, which claims the benefit of Canadian Application No. 2,552,282, filed on Jul. 18, 2006. The entire contents of each of U.S. application Ser. No. 13/724,058, U.S. application Ser. No. 12/373,945, International Application No. PCT/CA2007/001254, and Canadian Application No. 2,552,282 are hereby incorporated herein by reference in their entirety.

FIELD OF THE INVENTION

The present invention relates to a method for preparing a multilayer material based on active lithium, a method for its preparation, and its use in electrochemical batteries.

RELATED ART

Lithium metal batteries in which the electrolyte is a polymer electrolyte have the advantage of supplying an energy density by weight and volume that is higher than that of Li-ion batteries, thanks to the capacitance of the lithium metal anode which is 3700 mAh/g. This value is 10 times higher than that of an anode based on graphite ($LiC_6$) or 20 times higher than that of an anode of the titanium spinel ($Li_4Ti_5O_{12}$) type.

On the other hand, during the charging of high current lithium batteries, in which the lithium is electrodeposited, a potential formation of dendrites on the lithium surface may occur fairly rapidly after a few cycles of use. These dendrites may perforate the separator (in which the electrolyte is impregnated) and touch the cathode.

One solution to this problem of instability is proposed in U.S. Pat. No. 6,214,061. It consists in protecting a film of lithium forming the anode of a battery by a protective layer consisting of a vitreous ion-conducting material, for example glass or a lithium phosphorus oxynitride, designated by LIPON. The protective layer is deposited on a substrate, the lithium layer is then deposited on the protective layer, and a current collector is finally deposited on the lithium layer. The protective layer and the lithium layer are deposited by cathode sputtering or by vapor deposition. This technique yields good results. However, it requires operation under vacuum for the deposition of the protective layer and of the lithium layer, demanding more complicated and more costly devices at the industrial level.

The use of a thin film of lithium is important in lithium metal polymer batteries, because it serves to optimize the excess lithium, by comparison with the capacitance of the cathode.

The technology for obtaining thin films of lithium metal by lamination is described in CA-A-2 099 524 and CA-A-2 099 526 in the name of Hydro-Quebec.

CA-A-2 099 524 describes a method for laminating a lithium strip for obtaining a lithium film between 10 and 100 μm thick. This method is characterized by the fact that at the discharge end of the roll mill and after a single passage, in the presence of a lubricant, the roll mill film remains adhering to the surface of one of the working rolls up to a given point on a portion of the circumference of this roll beyond the meeting point of the two rolls. Although the film obtained thereby can be used in an electrochemical generator, it has a passivation layer with a non-negligible thickness.

CA-A-2 099 526 describes additives for lubricants usable in the lamination of lithium strips in thin films, which improves their performance. These additives are represented by the general formula L-A-B where L is a hydrocarbon radical acting as a lubricant segment, B denotes an oligomer segment serving as a solvate segment for the metal salts, and A is a chemical bond joining the hydrocarbon radical to the oligomer segment.

SUMMARY

It is an object of the present invention to propose a method for preparing electrochemical batteries which have an anode whereof the active material is a thin film of lithium, which can be implemented at atmospheric pressure, that is in the most convenient industrial conditions, and which yields batteries in which said lithium film adheres perfectly to the elements of the battery adjacent to it and does not form dendrites during operation.

This is why the present invention relates to a method for preparing a multilayer comprising at least one film of lithium, the multilayer obtained, and its use as an anode in an electrochemical battery.

The inventive method is suitable for preparing a multilayer material comprising at least one layer of active lithium, and it is characterized in that it comprises a step of depositing a film of active lithium on a protective layer at a sufficient speed so that substantially no oxidation of the lithium occurs, and/or during a sufficient time for the adhesion of the lithium to develop after contact with the protective layer.

The multilayer material according to the invention comprises at least one layer of active lithium which carries a protective layer on at least one of its surfaces, said protective layer consisting or consisting essentially of an ion-conducting material.

A multilayer material of the invention, when incorporated in an electrochemical battery as an anode, has excellent impedance stability, with no formation of dendrites during cycling.

The batteries of which the anode comprises a multilayer material of the invention are particularly efficient in terms of their coulombic efficiency.

BRIEF DESCRIPTION OF THE DRAWINGS

FIG. 1A is an enlarged view of the zone T=0 to 1 of FIG. 1B.

GENERAL DESCRIPTION OF THE INVENTION

Figure 1A:
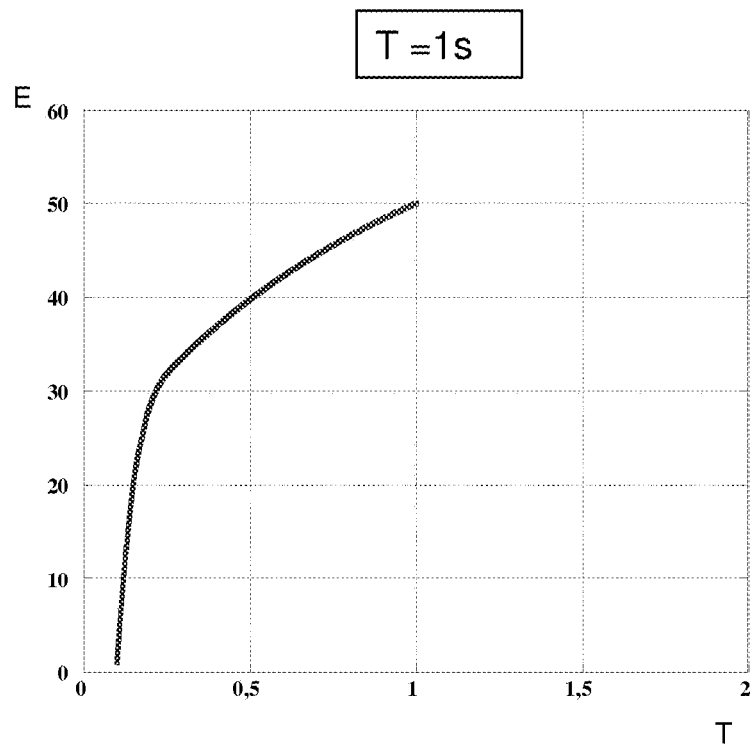
FIGS. 1A and 1B: show the variation in thickness of a passivation film of lithium (E, in Å) on the y-axis, as a function of exposure time in a dry air atmosphere (T, in seconds) on the x-axis, for a lithium film obtained according to the invention.
Figure 1B:
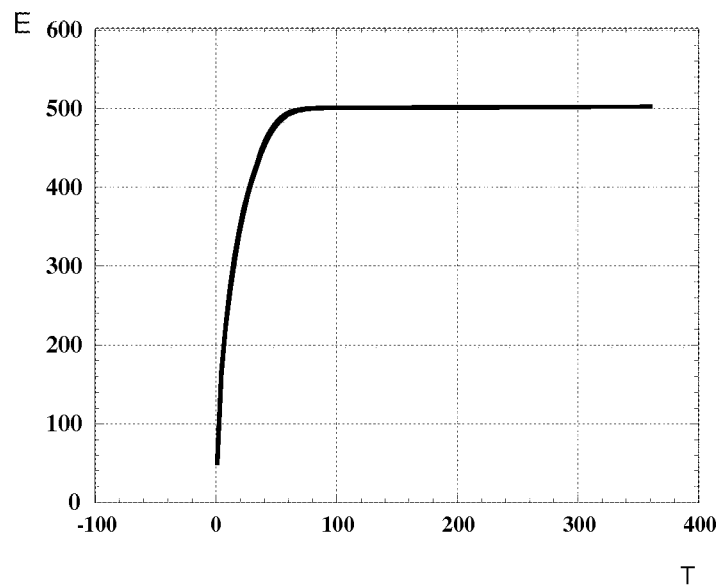
Figure 2:
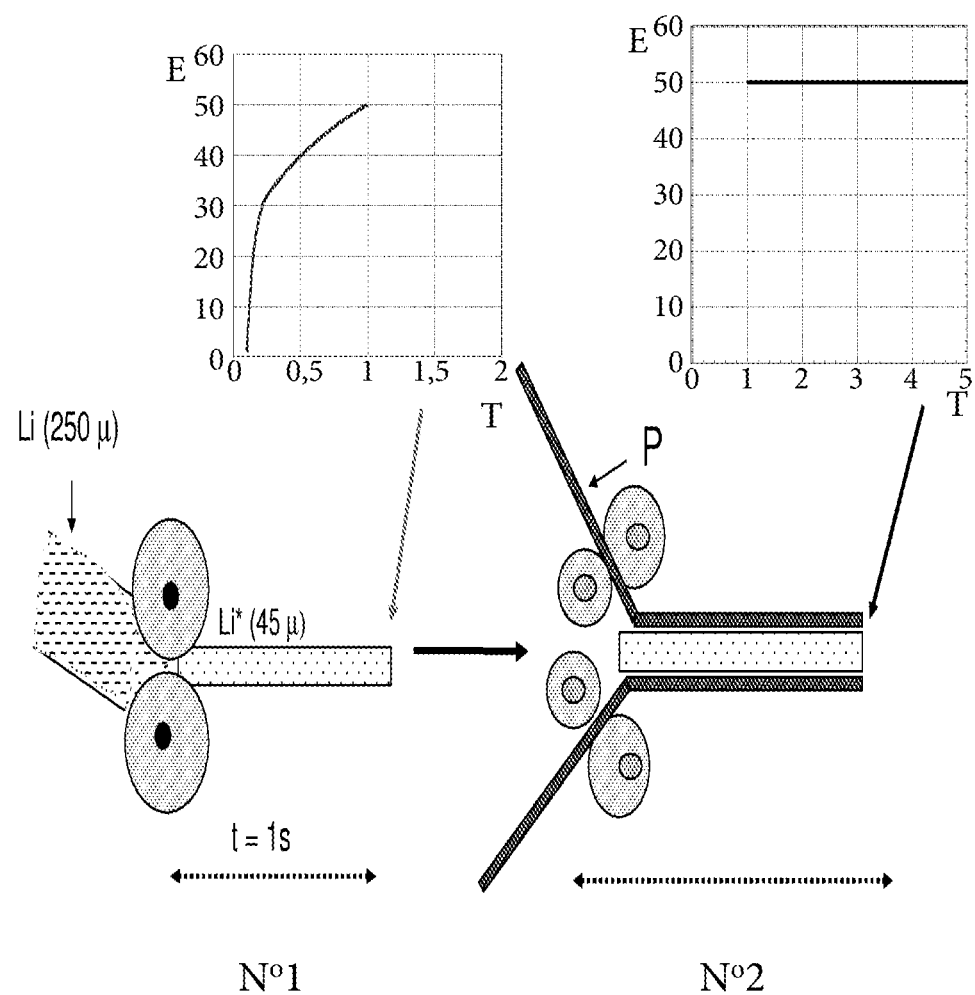
FIG. 2: shows the method for applying the protective film to the lithium, which serves to maintain the thickness of the passivation layer of lithium constant over time; the curves E (in Å) as a function of T (in seconds) show the variation in thickness of the passivation layer, before (left-hand curve) and after the deposition of two protective layers (right-hand curve); Li denotes a film of standard lithium, Li* denotes a film of active lithium; P denotes the protective material (glass or ceramic); No. 1 and No. 2 respectively denote the 1$^{st}$ and the 2$^{nd}$ step of the process.

A first object of the invention relates to a method for preparing a multilayer material which comprises at least one layer of active lithium, said method comprising a step of depositing a film of active lithium on a protective layer at a sufficient speed so that substantially no oxidation of the lithium occurs, and/or during a sufficient time for the adhesion of the lithium to develop after contact with the protective layer.

The layer of active lithium consists or consists essentially of lithium which has a degree of purity higher than 99%, or of a lithium alloy comprising less than 3000 ppm of impurities. Such a layer has good adhesion properties.

In one embodiment, the layer of active lithium carries on one or each of its surfaces, a passivation layer which is such that the ratio "thickness of the passivation layer"/"thickness of the layer of active lithium" is between $2.10^{-5}$ and $1.10^{-3}$.

In another embodiment, the thickness of the passivation layer is zero.

The passivation layer comprises at least one lithium compound from the group consisting of $Li_2O$, $Li_2CO_3$, LiOH, and $Li_2S_2O_4$. $Li_2O$, $Li_2CO_3$ and LiOH are formed in a dry atmosphere; $Li_2S_2O_4$ is formed in the presence of $SO_2$.

It is particularly preferred to effect the deposition of the film of active lithium on the protective layer by lamination. The conditions for carrying out a lithium deposition on a support layer by lamination, especially the additives used, in particular the lubricants, are described in CA-A-2 099 524 and CA-A-2 099 526.

When the multilayer material is intended for use as a two-sided anode in a battery, a protective layer is deposited on each of the surfaces of the film of lithium, the two protective layers consisting or consisting essentially of an ion-conducting material.

When the multilayer material is intended for use as a one-sided anode in a battery, the film of active lithium is deposited on a protective layer consisting or consisting essentially of an ion-conducting material. It is advantageous to deposit, on the other surface of the film of active lithium, a protective layer consisting or consisting essentially of an electron conducting material which may act as a current collector for the anode.

The deposition of the lithium layer by lamination allows operation at atmospheric pressure. The multilayer material is preferably prepared in a dry air atmosphere, in an anhydrous chamber characterized by a dew point between −45 and −55° C., which is between 0.7 and 2.2%, and preferably at −50° C. at 1.3% relative humidity.

A protective layer may be deposited in 1 to 15 seconds.

When the multilayer material comprises two protective layers on either side of the layer of active lithium, the second protective layer may be deposited on the film of active lithium at the same time as the first protective layer is deposited on the other free surface of the lithium film. The second layer may also be deposited after the deposition of the first layer, preferably less than 15 seconds after.

The material used to form a protective layer has an ion conduction higher than $10^{-4}$ S·cM$^2$, and is selected from ceramics, glasses, polymers, and mixtures thereof.

An ion-conducting protective layer may comprise at least two sublayers, consisting or consisting essentially of, independently of one another, a material which has an ion conduction higher than $10^{-4}$ S·cm$^2$, and which is selected from ceramics, glasses, and polymers optionally containing a ceramic filler.

A protective layer of ceramic advantageously consists or consists essentially of a ceramic of the nonstoichiometric lithium phosphorus oxynitride type. This type of ceramic is generally designated by the name LIPON. In the context of the present invention, the compound $Li_{3.3}PO_{3.9}N_{0.17}$ and similar compounds are preferably used. A detailed presentation of LIPON compounds of their use, particularly for the preparation of thin films for all-solid batteries, is provided in "Micro Power Sources", K. Zaghib and S. Surampudi, Proceedings Volume 2000-03, pp. 70 to 79, published by The Electrochemical Society.

A LIPON ceramic layer may be deposited on a substrate by cathode sputtering, laser or plasma ablation, for example from a $Li_3PO_4$ target. The substrate for the deposition of the protective film may be a film of propylene or of a PP-PE-PP copolymer serving as a separator in the generator. The substrate may further be a ½ cell and consists of a collector, a cathode and an electrolyte, the LIPON layer being deposited on the electrolyte layer. The protective layer may also be formed on any substrate carrying a film of PP, said film being removable by peeling after formation of the protective layer, and deposition of the lithium film on the protective layer.

A protective layer may further consist or consists essentially of glass.

A protective layer consisting or consisting essentially of a ceramic or of a glass preferably has a thickness equal to or lower than 1 μm.

A protective layer may consist or consists essentially of a solution of an ionic compound in a polymer or of a polymer carrying ionic groups. The polymer may further contain a ceramic.

A protective layer of the polymer type preferably has a thickness of 1 to 100 μm.

For the protective layer consisting or consisting essentially of a polymer to have good mechanical strength, it is preferable to select either a high molecular weight polymer which has an intrinsic mechanical strength, or a polymer which has crosslinkable groups and to which a crosslinkage imparts the mechanical strength. Polyethers or polyvinyls are particularly preferred.

Polymers usable as a material constituting a protective layer may be selected from polymers with 3 branches and polymers with 4 branches.

Polymer with 3 branches means a polymer having 3 branches in the form of a three-branched comb, like those described in "Relationship between Structural Factor of Gel Electrolyte and Characteristics of Electrolyte and Lithium-ion Polymer Battery Performances", by Hiroe Nakagawa et al, The 44$^{th}$ Symposium in Japan, Nov. 4-6, 2003, abstract 3D26. The 3 substantially parallel branches of these polymers are preferably fixed to the center and to the two ends of a small skeleton, preferably comprising 3 atoms, more particularly 3 carbon atoms in the chain. In the case of a chain with 3 carbon atoms, each of the atoms is connected to a branch.

Among these polymers with 3 branches, those which have an average molecular weight ($M_w$) of between 1,000 and 1,000,000 are preferred, more particularly those having an average molecular weight of between 5,000 and 100,000.

Polymer with four branches means a polymer in the form of a four-branched comb. WO-03/063287 describes a preferred family of polymers with four branches. The 4 substantial parallel branches of these polymers are fixed respectively between the two ends (preferably symmetrically on the chain) and at the two ends of a small chain preferably having 4 atoms, which are preferably 4 carbon atoms. In the case of a chain having 4 carbon atoms, each atom is connected to a branch.

Among these four-branched polymers, those having hybrid terminal groups are preferred, more particularly hybrid acrylate (preferably methacrylate) and alkoxy (preferably alkoxy with 1 to 8 carbon atoms, in particular methoxy or ethoxy), or vinyl groups, at least one branch of said four-branched polymer (and preferably at least two branches) being capable of giving rise to a crosslinkage.

Another family of polymers with four branches, useful for the present invention, is described in columns 1 and 2 of U.S. Pat. No. 6,190,804. This document is incorporated by reference in the present application.

The polymer is preferably a star polyether which has at least four branches having terminal groups containing the following functions: acrylate or methacrylate and alkoxy, allyloxy and/or vinyloxy, at least one, and preferably at least two of these functions being active for crosslinkage. It has a voltage stability much higher than 4.

An example of a polyether with 4 branches is a tetrafunctional polymer preferably having a high molecular weight and having the formula (1):

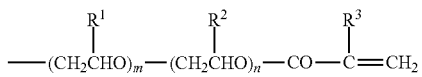

where:
R$^1$ and R$^2$ each represent a hydrogen atom or a lower alkyl (preferably having 1 to 7 carbon atoms);
R$^3$ represents a hydrogen atom or a methyl group;
m and n each represent a whole number higher than or equal to 0;
in each high molecular weight chain, m+n>35;
each of the groups R$^1$, R$^2$, R$^3$ and each of the parameters m and n may be identical or different in the 4 high molecular weight chains.

Among these polymers with four branches, those which have an average molecular weight between 1,000 and 1,000,000, preferably between 5,000 and 100,000, are particularly advantageous.

Vinyl polymers of the ethylene glycol (EG) type, and more particularly those described in EP-A-1 249 461 (DKS), are also advantageous as protective materials, in particular those having an average molecular weight between 600 and 2,500.

Polymers of this family may advantageously be obtained by reacting ethylene oxide and 2,3-epoxy-1-propanol with HO—(—CH$_2$CH$_2$O—)$_4$—H) or by reacting 2,3-epoxy-1-propanol with ethylene glycol. This step is followed by the grafting of polymerizable and/or nonpolymerizable functional groups at each end of the skeleton and of the side chains of the polymer. Compounds having one or more groups carrying an active hydrogen and alkoxy groups may also be used in the form of monomers which are crosslinked in situ, during the preparation of the protective layer.

The hydroxyl group is an example of a group carrying an active hydrogen. Compounds having 1 to 5 hydroxyl groups are preferred. The monomethylether of triethyleneglycol, ethyleneglycol, glycerin, diglycerin, pentaerythritol and derivatives thereof are specific examples of compounds having one or more groups carrying an active hydrogen.

CH$_3$ONa, t-BuOK and derivatives thereof are specific examples of precursor alkoxides of alkoxy groups.

The polyether polymers used as a material for the protective layer have a structural unit represented by the formula (1) and the structural unit represented by the formula (2) and/or the structural unit represented by the formula (3). The number of units having formula (1) in a molecule is between 1 and 22,800, preferably between 5 and 11,400, and more particularly between 10 and 5,700. The total number of units having formula (2) and/or formula (3) is between 1 and 13,600, preferably between 5 and 6,800, and more preferably between 10 and 3,400.

(Meth)acrylate groups, allyl groups and vinyl groups are examples of polymerizable functional groups grafted at each molecular end. Alkyl groups and functional groups comprising boron atoms are examples of nonpolymerizable functional groups. Among alkyl groups, alkyl groups having 1 to 6 carbon atoms are preferred, particularly those having 1 to 4 carbon atoms, and more particularly the methyl group.

Examples of functional groups comprising boron atoms include those presented by the following formulas (4) or (5)

The groups R$^{11}$ and R$^{12}$ in formula (4) and the groups R$^{21}$, R$^{22}$ and R$^{23}$ in the formula (5) may be identical or different, and alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulfonamide, oxycabonylamino, ureid, acyl, oxycarbonyl, carbamoyl, sulfonyl, sulfinyl, oxysulfonyl, sulfamoyle, carboxylate, sulfonate or phosphonate group, a heterocyclic group, or a —B(R$^a$)(R$^b$), —OB(R$^a$)(R$^b$) or OSi(R$^a$)(R$^b$)(R$^c$) group in which (R$^a$), (R$^b$) and (R$^c$) each represent a hydrogen, a halogen, an alkyl, alkoxy, aryl, alkenyl, alkynyl, aralkyl, cycloalkyl, cyano, hydroxyl, formyl, aryloxy, alkylthio, arylthio, acyloxy, sulfonamide, oxycarbonylamino, ureid, acyl, oxycarbonyl, carbamoyl, sulfonyl, sulfinyl, oxysulfonyl, sulfamoyle, carboxylate, sulfonate, phosphonate, heterocyclic group or derivatives thereof. R$^{11}$, and R$^{12}$ in the formula (4) and R$^{21}$ and R$^{22}$, R$^{23}$ in the formula (5) may be joined together to form a ring, and the ring may have substitutes. Each group may also be substituted by substitutable groups. $X^+$ in the formula (5) represents an alkali metal ion, preferably a lithium ion.

The ends of the molecular chains in the polyether polymer may all be polymerizable functional groups, nonpolymerizable functional groups, or both.

The average molecular weight (Mw) of a polyether polymer is not especially limited, but it is usually about 500 and 2 million, and advantageously about 1,000 up to 1.5 million.

The polymers of these preferred families are also advantageously selected from polymers which are crosslinkable by ultraviolet, infrared, heat treatment and/or electron beam (EBeam).

When a protective layer is intended to form the collector of the anode, it consists or consists essentially of an electron-conducting material. The electron-conducting material may be of metal, selected from Ni, Cu and stainless steel.

A metal protective layer may be obtained by a physical or chemical vapor deposition method, preferably with a thickness of 100 to 150 Å. It may also be obtained from a free metal strip, preferably having a thickness of 10 to 15 µm.

Preferably, a metal protective layer has a surface resistivity lower than 1 $\Omega/cm^2$.

A second object of the invention relates to the multilayer material obtained by the inventive method.

A multilayer material according to the invention comprises at least one layer of active lithium and one protective layer adhering to one another, characterized in that the lithium layer is a layer of active lithium which carries, on at least one of its surfaces, a continuous or discontinuous passivation layer having an average thickness of less than 50 Å, and in that said at least one protective layer consists or consists essentially of an ion-conducting material.

When the multilayer material is intended to form a two-sided anode of an electrochemical battery, the two surfaces of the layer of active lithium carry an ion-conducting protective layer. The two protective layers may consist or consists essentially of the same material or of different materials.

When the multilayer material is intended to form a one-sided anode of an electrochemical battery, one of the surfaces of the layer of active lithium adheres to a protective layer consisting or consisting essentially of an ion-conducting material, and the other surface of the layer of active lithium adheres to a protective layer consisting or consisting essentially of an electron conducting material.

In a multilayer material obtained by the inventive method, the adhesiveness between the lithium layer and the protective layer, measured by the method ASTM No. D3359, is higher than 4, on a scale from 1 to 5.

The protective layers prevent the exposure to an atmosphere from causing the formation or growth of a lithium passivation layer.

A multilayer material consisting or consisting essentially of a layer of active lithium between two metal protective layers preferably has an application in areas other than electrochemical generators.

A third object of the invention relates to an electrochemical battery comprising at least one cathode, an electrolyte, and at least one multilayer material of the invention as an anode. The multilayer material of the invention may advantageously be incorporated in various types of electrochemical battery. The battery may be a one-sided battery or a two-sided battery. The battery may be in the form of an all-solid battery, a liquid electrolyte battery or a gel electrolyte battery.

A one-sided battery comprises at least one assembly comprising the following elements, in the order indicated:
a collector;
a cathode material;
a polymer electrolyte, or a separator impregnated with a gel electrolyte or a separator impregnated with a liquid electrolyte;
a multilayer material;
said multilayer material comprises a layer of active lithium between a metal protective layer and a nonmetallic protective layer, consisting or consisting essentially of a material selected from ceramics of the LIPON type, ionic glasses, conducting polymers, polymers containing ceramic fillers, and polymers made conducting by the addition of a solution of an ionic compound in a liquid solvent, the nonmetallic protective layer being in contact with the electrolyte.

A two-sided battery comprises at least one assembly comprising the following elements, in the order indicated:
a collector;
a cathode material;
a polymer electrolyte;
a multilayer material;
an electrolyte;
a cathode;
a collector;
said multilayer material comprises a layer of lithium between two protective layers, each consisting or consisting essentially of, independently of one another, a material selected from LIPON, ionic glasses, conducting polymers and polymers containing ceramic fillers, and polymers made conducting by the addition of a solution of an ionic compound in a liquid solvent.

The electrolyte of a battery according to the invention may be a polymer electrolyte, a separator impregnated with a gel electrolyte, or a separator impregnated with a liquid electrolyte.

The cathode of a battery according to the invention consists or consists essentially of a material which comprises an active cathode material, and/or an electron conductor and/or a polymer, and/or a lithium salt and/or a binder.

The active material of the cathode may be selected from $LiV_3O_8$, $V_2O_5$, $LiCoO_2$, $LiMn_2O_4$, $LiMn_{1/3}Co_{1/3}Mn_{1/3}O_2$, and mixtures thereof.

The polymer is preferably a polyether.

The electron conductor consists of Ketjen carbon, Shawinigan carbon, graphite, carbon fibers, vapor-deposited carbon fibers, and mixtures of at least two thereof.

The lithium salt is preferably selected from lithium bis-trifluoromethanesulfonylimide (LiTFSI), lithium bis-fluorosulfonylimide (LiFSI), lithium dicyanotriazole (LiDCTA), lithium bis-pentafluoroethanesulfonylimide (LiBETI), $LiPF_6$, $LiBF_4$, LiBOB, and mixtures thereof.

The binder is preferably selected from the group consisting of PVDF, PTFE, and water soluble binders (WSB), such as a SBR rubber for example.

The collector of the cathode preferably consists or consists essentially of aluminum optionally coated with carbon.

In an advantageous embodiment, the anode of the generator according to the invention is a multilayer material which has a metal protective layer, consisting or consisting essentially of Ni or Cu, this protective layer forming the collector of the anode.

When the lithium film of the multilayer is in contact with a nickel or copper support, said support serves as a current collector. The electrolyte of a generator according to the invention may be a liquid or gel electrolyte which impregnates a separator consisting of a polypropylene (PP) or a sequenced copolymer of polypropylene and ethylene (PP-PE-PP).

The gel electrolyte may be obtained from a composition comprising at least one polymer having crosslinkable groups, at least one lithium salt or at least one liquid solvent and at least one crosslinking agent. The polymer is advantageously a polyether or a mixture of four-branched polyethers or polyethylene glycol, preferably having an average molecular weight MW of between 2,000 and 10,000, more particularly between 2,500 and 8,000. The lithium salt may be selected from those mentioned above for the cathode material. The liquid solvent is a polar aprotic solvent selected from ethyl carbonate (EC), propylene carbonate (PC), dimethyl carbonate (DMC), methyl and ethyl carbonate (EMC), diethyl carbonate (DEC), γ-butyrolactone (GBL), vinyl carbonate (VC) and from molten salts having a SP lower than 50 Å, and mixtures thereof.

A fourth object of the invention relates to a method for preparing a battery of which the anode is made from active lithium, using a multilayer material of the invention as the anode material.

A generator according to the invention can be prepared by depositing a layer of glass or ceramic adjacent to a layer of active lithium, on a half-cell consisting or consisting essentially of a cathode film and an electrolyte film.

When the electrolyte of a generator according to the invention is a polymer gel electrolyte, a crosslinkable polymer is preferably used, and it is crosslinked by UV, IR or electron beam irradiation, or by heating or by a combination of both, after having deposited it on a substrate. The crosslinkable polymer may be selected from crosslinkable polymers defined for the material constituting the protective layer. It is particularly advantageous to carry out the crosslinkage within the generator, after having sealed it.

DESCRIPTION OF PREFERENTIAL EMBODIMENTS OF THE INVENTION

All-Solid Battery

For preparing an all-solid battery, a layer of ceramic (constituting the protective layer) is deposited on a substrate consisting of a half-cell, by plasma sputtering (including nitrogen gases) from a source of LIPON (lithium-phosphorus-nitrogen) prepared by the method described in New Power Source, P V 2000-03, by K Zaghib and Surampudi, pages 16 to 30 and pages 70 to 80. The half-cell comprises a cathode and a solid polymer electrolyte (SPE). The LIPON layer deposited advantageously has a thickness of about 1 µm. The half-cell consists of the superimposition of a collector, a cathode forming material, and the SPE electrolyte. The protective layer is deposited on the SPE layer of the half-cell.

The cathode material consists of an active cathode material (for example $LiV_3O_8$), a binder and optionally a material imparting ion conduction and a material imparting electron conduction. The binder may be a polymer of the polyether type. The material imparting ion conduction is a lithium salt, for example LiTFSI. The material imparting electron conductivity may be a high specific surface area carbon. The cathode has a thickness of 45 µm.

The SPE electrolyte consists of a solution of LiTFSi in a polyether type of polymer, and its thickness is advantageously between 20 and 30 µm. A film of lithium is then deposited on the LIPON film. The starting lithium is a commercial extruded film 250 µm thick, which has a passivation layer more than 50 Å thick. This lithium film is laminated between two stainless steel rolls in a Class 1,000 type anhydrous chamber, to obtain a 50 µm thick film of lithium. The rolling is preferably carried out in the presence of a lubricant and/or an additive preferably selected from those described in CA-A-2 099 526.

This 50 µm thick film is actively deposited on the SPE surface, that is very rapidly and before the lithium is passivated by the air. The deposition is preferably carried out in less than 2 seconds.

It has thus been discovered that, if this operating mode is carried out in a predefined time, it unexpectedly avoids the rapid growth of the passivation film, which is generally formed of lithium carbonate $Li_2CO_3$ and oxide $Li_2O$ and LiOH, and it provides a very strong adhesiveness of the layer of active lithium to the protective layer.

The deposition of active lithium on the LIPON, by the method of the invention, thereby serves to minimize the thicknesses of the $Li_2CO3$ and $Li_2O$ layers, thereby substantially improving the long-term cyclability of the all-solid battery. By thus lowering the impedance of the battery, excellent performance is obtained, particularly in use with high currents.

The deposition of the film of active lithium on the LIPON layer results in the inhibition of the formation of dendrites thanks to the presence of the hard and solid layer of LIPON on the lithium.

Liquid Electrolyte Battery

A liquid electrolyte battery according to the invention comprises a cathode, a separator impregnated with an electrolyte, a protective layer, and an anode consisting of a film of active lithium.

The cathode may be made from a composite, similar to the one described for the all-solid battery.

The separator may be made from polypropylene (PP) or a PP-PPE-PP for example of the CELGARD type.

The electrolyte is advantageously a solution of lithium salt (for example LiTFSI) in a solvent (for example a mixture of ethylene carbonate and diethylene carbonate).

The film of active lithium is obtained by laminating a film of commercial lithium.

For assembling a battery, the LIPON film is deposited on one of the faces of the separator by cathode sputtering, the active lithium is rapidly deposited on the free-face of the LIPON, and a film of cathode material is then deposited on the free face of the separator.

Gel Electrolyte Battery

According to this particular embodiment of the invention, a cathode is fabricated from a composition prepared by mixing 82% of $LiFePO_4$ (produced by Phostech) with 3% by weight of Ketjen black, 3% of graphite, 12% of PVDF in the presence of the solvent NMP, at the rate of 20% by weight, of the total weight of the powders previously mixed.

The solution is spread on an aluminum carbon collector, and the solvent is evaporated. A film is obtained having a thickness of 45 microns, with a porosity of 73%. The cathode is calendered until a porosity of 40% is obtained.

A ceramic film of the LIPON type having a thickness of 1 µm is deposited on a film of Celgard 3501®, and a film of active lithium is then deposited on the free surface of the LIPON film, by lamination of an extruded lithium.

The cathode is then deposited on the free face of the Celgard 3501° film.

The assembly thus produced is introduced into a flexible aluminum bag, together with a mixture of precursors of the gel electrolyte, and the bag is then sealed. The mixture of precursors consists of 95% by weight of a polyether (which is preferably of the four-branched type), a mixture of 1 M LiTFSi+0.5 M LiPF$_6$+EC+GBL (1:3 by volume), and 1,000 ppm of Pekadox 16° as crosslinkage initiator.

The battery was sealed by the technique described in WO2004/068610 relative to a rechargeable electrochemical generator, and more particularly in example 2 of the document.

The battery is maintained at 60° C. for one hour. This step is necessary to form the gel in the pores present on the surface of the electrode material, of the Celgard and in the LIPON pores. The batteries prepared by implementing this method are functional at ambient temperature.

It has been found unexpectedly that lithium, owing to its particular chemical reactivity, develops an excellent adhesion with glasses and ceramics immediately after its lamination.

EXAMPLES

The examples below are provided for illustration and are nonlimiting for the object of the invention.

Example 1

A half-cell is prepared consisting of a current collector, a cathode material and a solid polymer electrolyte SPE.

The cathode material consists of LiV$_3$O$_8$, a polyether binder, LiTFSI and a high specific surface area carbon. The cathode has a thickness of 45 μm.

The electrolyte SPE consists of a solution of LiTFSi in a polyether type of polymer, and its thickness is between 20 and 30 μm.

A film of metal lithium having a thickness of 250 μm is obtained by extrusion, and then manually laminated with a jeweler's roll mill for 2 seconds. A lithium film having a thickness of 55 μm is thus obtained, with a passivation film on its surface of which the thickness is 25 Å.

This film is extremely sticky and adheres to the assembly on the LiV$_3$O$_8$/SPE half-cell. The half-cell has an impedance of 6Ω, which is much lower, hence more advantageous, than the impedance of 12Ω of a cell containing a standard lithium film at the same measurement temperature of 60° C.

Example 2

A film of metal lithium having a thickness of 250 μm is obtained by extrusion. It is then laminated with a jeweler's roll mill, at ambient temperature for 2 seconds. A film of active lithium, having a thickness of 55 μm, is thus obtained, and it has a passivation layer having a thickness of 45 Å. This film was evaluated on the same day in an XPS analyzer. The thickness measured for the Li$_2$O layer is 255 Å.

A film of active lithium which remained for one week in an anhydrous chamber has a Li$_2$O layer having a thickness of 250 Å and a Li$_2$CO$_3$ layer having a thickness of 125 Å.

These values should be compared with those of the commercial lithium from FMC, in which the Li$_2$O layer has a thickness of 400 Å and the Li$_2$CO$_3$ has a thickness of 150 μm.

Example 3

A current collector/cathode material/SPE half-cell is prepared by the method of example 1.

A LIPON layer is deposited by sputtering on the SPE face of the half-cell, from a Li$_3$PO$_4$ target. It has a thickness of 900 nm and an adhesiveness, measured by ASTM method number D3359, of 5/5.

Example 4

A LiV$_3$O$_8$/SPE/LIPON/lithium type battery was prepared by the following process. On the SPE face of a half-cell "current collector/cathode material/SPE" prepared by the procedure in example 1, a layer of LIPON having a thickness of 1 μm was deposited by cathode sputtering.

A film of lithium was then deposited on the LIPON film, from a commercial extruded film having a thickness of 250 μm, and which has a passivation layer more than 50 Å thick. This film of commercial lithium was laminated between two stainless steel rolls in a Class 1,000 type anhydrous chamber, to obtain a 50 μm thick lithium film.

This 50 μm thick film was actively deposited on the SPE surface, in less than 2 seconds, and a current collector was then deposited on the lithium film.

The battery thereby produced has a capacitance of 5 mAh. It was cycled in C/3 discharge and charged to a constant potential of 3.1 volts for 1 hour. The capacitance and coulombic efficiency are stable during the 100 cycles. A 3% loss of capacitance is measured after 100 cycles, but the coulombic efficiency remains between 99.9 and 100%.

A LiV$_3$O$_8$/SPE/lithium battery, prepared with a similar half "current collector/cathode material/SPE" half-cell and with a standard lithium, was cycled in C/3 in discharge and charged in 2 C to a constant potential of 3.1 volts for 1 hour. After 10 cycles, the capacitance dropped by 30% and the coulombic efficiency by 50%.

In conclusion, the preceding examples demonstrate the very low thickness of the passivation layer in the multilayer materials of the invention, and the exceptional adhesion of the lithium to its protective layer.

Furthermore, the batteries incorporating a multilayer material of the invention are characterized by a low impedance and by an outstanding coulombic efficiency in charge/discharge.

Although the present invention has been described with the help of specific embodiments, it is understood that several variations and modifications may be grafted to said practices, and it is the object of the present invention to cover such modifications, uses or adaptations of the present invention, generally following the principles of the invention and including any alternative to the present description which becomes known or conventional in the field of activity in which the present invention applies, and which may be applied to the essential elements mentioned above, in agreement with the scope of the following claims.

The invention claimed is:

1. A method for preparing a multilayer material which comprises at least one layer of a film of active lithium, said method comprising:
   producing a film of active lithium which comprises a first and a second surface by laminating and reducing thickness of a lithium sheet between a first set of rolls;
   laminating between a second set of two rolls directly to the first surface of the film of active lithium a first protective layer at a sufficient speed so that oxidation of the first surface of the film of active lithium occurs to form a passivation layer having an average thickness of less than 50 Å, and during a sufficient time for the adhesion of the first surface of the film of active lithium to the first protective layer to develop after contact with said protective layer, wherein said first protective layer consists essentially of a ceramic deposited on an electrolyte layer said ceramic being in contact with the first surface of the film of active lithium, and wherein said first protective layer is laminated in 1 to 15 seconds;

laminating to the second surface of the film of active lithium, a second protective layer consisting essentially of an electron-conducting material;

wherein said method is carried out in a dry air atmosphere, in a chamber with a dew point between −45° C. and −55° C. and a relative humidity between 0.7 and 2.2%.

2. The method according to claim 1, wherein the layer of a film of active lithium consists of lithium which has a degree of purity higher than 99%, or of a lithium alloy comprising less than 3000 ppm of impurities.

3. The method according to claim 1, wherein the passivation layer is such that the ratio "thickness of the passivation layer"/"thickness of the layer of a film of active lithium" is between $2.10^{-5}$ and $1.10^{-3}$.

4. The method according to claim 3, wherein the passivation layer comprises at least one lithium compound from the group consisting of $Li_2O$, $Li_2CO_3$, LiOH, and $Li_2S_2O_4$; wherein $Li_2O$, $Li_2CO_3$ and LiOH are formed in a dry atmosphere.

5. The method according to claim 1, wherein the first protective layer comprises at least two sublayers, consisting essentially of, independently of one another, a material which has an ion conduction higher than $10^{-4} S \cdot cm^2$, and which is selected from ceramics.

6. The method according to claim 1, wherein the material constituting the first protective layer consists essentially of a ceramic of the nonstoichiometric lithium phosphorus oxynitride type (LIPON).

7. The method according to claim 1, wherein the first protective layer consists essentially of a ceramic with a thickness equal to or less than 1 μm.

8. The method according to claim 1, wherein the first protective layer and second protective layer are laminated within 15 seconds of each other.

9. The method according to claim 1, wherein the first protective layer and second protective layer are laminated at the same time.

10. The method according to claim 1, wherein the method is carried out in a dry air atmosphere under atmospheric pressure.

11. The method according to claim 1, wherein said second protective layer is laminated in less than 15 seconds after lamination of the first layer.

12. A multilayer material obtained by the method according to claim 1, comprising at least one layer of active lithium having a first protective layer adhering to a first surface of the at least one layer of active lithium, and a second protective layer adhering to a second surface of the at least one layer of active lithium, wherein the lithium layer is a layer of active lithium which carries, on at least the first surface, a continuous or discontinuous passivation layer having an average thickness of less than 50 Å, and wherein the first protective layer consists essentially of an ion-conducting material consisting essentially of a ceramic and wherein the second protective layer consists essentially of an electron-conducting material; and wherein the passivation layer forms on the surface between the lithium film formation and its combination with the protective layers such that its is located on the lithium surfaces in contact with the protective layers.

13. The multilayer material according to claim 12, wherein the first surface and second surface of the layer of active lithium each carry an ion-conducting protective layer.

14. The multilayer material according to claim 12, wherein the first surface of the layer of active lithium adheres to a protective layer consisting essentially of an ion-conducting material, and the second surface of the layer of active lithium adheres to a protective layer consisting of an electron-conducting material.

15. An electrochemical generator comprising at least one cathode, one electrolyte and at least one anode, wherein the anode comprises a multilayer material according to claim 12.

16. The generator according to claim 15, wherein the generator comprises at least one assembly comprising the following elements, in the order indicated:
  a collector;
  a cathode material;
  a polymer electrolyte, or a separator impregnated with a gel electrolyte or a separator impregnated with a liquid electrolyte;
  the multilayer material forming the anode;
wherein said multilayer material comprises a layer of active lithium between a metal protective layer and a nonmetallic protective layer, consisting essentially of a material selected from ceramics of the LIPON type, the nonmetallic protective layer being in contact with the electrolyte.

17. The generator according to claim 15, wherein the lithium film of the multilayer is in contact with a nickel or copper support which serves as a current collector.

18. A method for producing a battery, the method comprising:
  providing at least one cathode consisting essentially of a material which comprises an active cathode material and, optionally, one or more of an electron conductor, a polymer, a lithium salt, or a binder;
  providing an electrolyte layer comprising at least one electrolyte selected from the group consisting of polymer electrolytes, separators impregnated with gel electrolytes, and separators impregnated with liquid electrolytes;
  providing at least one anode consisting essentially of a multilayer material;
  wherein the multilayer material is prepared by producing a film of active lithium which comprises a first and a second surface by laminating and reducing thickness of a lithium sheet between a first set of rolls;
  laminating between a second set of two rolls directly to the first surface of the film of active lithium a first protective layer at a sufficient speed so that oxidation of the first surface of the film of active lithium occurs to form a passivation layer having an average thickness of less than 50 Å, and during a sufficient time for the adhesion of the first surface of the film of active lithium to the first protective layer to develop after contact with said protective layer, wherein said first protective layer consists essentially of a ceramic deposited on the at least one electrolyte layer said ceramic being in contact with the first surface of the film of active lithium, and wherein said first protective layer is laminated in 1 to 15 seconds;
  laminating to the second surface of the film of active lithium, a second protective layer consisting essentially of an electron-conducting material;
  wherein the first protective layer is deposited onto the electrolyte layer; and
  wherein said method is carried out in a dry atmosphere, in a chamber with a dew point between −45° C. and −55° C. and a relative humidity between 0.7 and 2.2%.

19. The method according to claim 18, wherein the active cathode material is selected from the group consisting of $LiV_3O_8$, $V_2O_5$, $LiCoO_2$, $LiMn_2O_4$, $LiMn_{1/3}CO_{1/3}Mn_{1/3}O_2$, and mixtures thereof.

20. The method according to claim 18, wherein the material constituting the first protective layer consists essentially of a ceramic of the nonstoichiometric lithium phosphorus oxynitride type (LIPON).

21. The method according to claim 18, wherein the film of active lithium consists of lithium which has a degree of purity higher than 99%, or of a lithium alloy comprising less than 3000 ppm of impurities.

22. The method according to claim 18, wherein the method is carried out in a dry air atmosphere under atmospheric pressure.

23. The method according to claim 18, wherein said second protective layer is laminated in less than 15 seconds after lamination of the first layer.

* * * * *